2,657,729

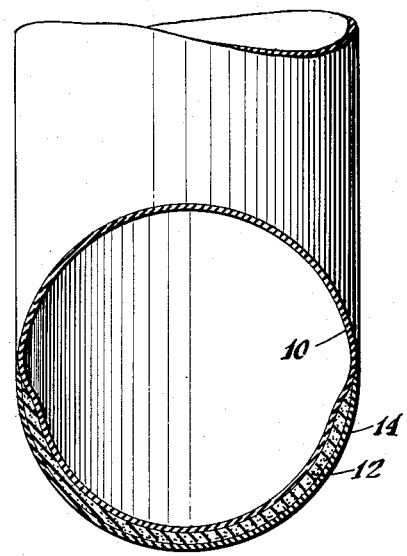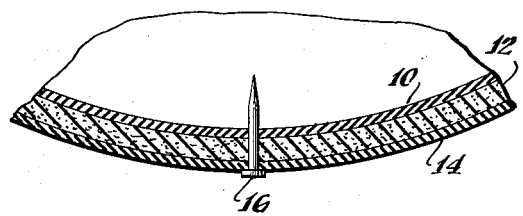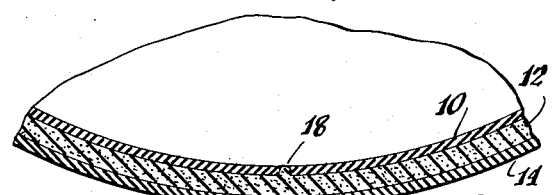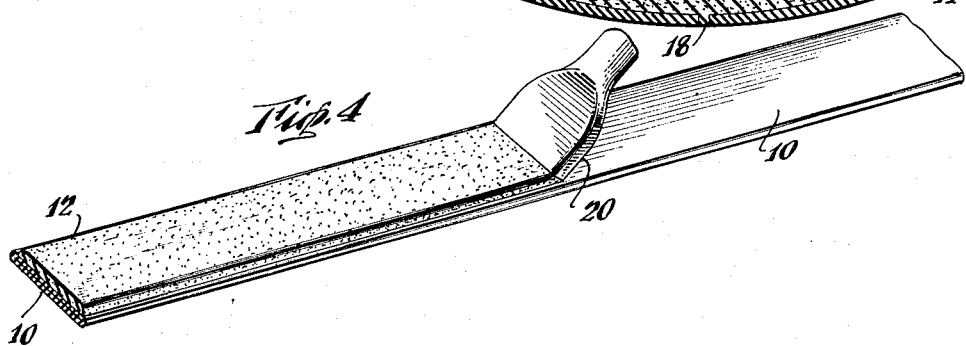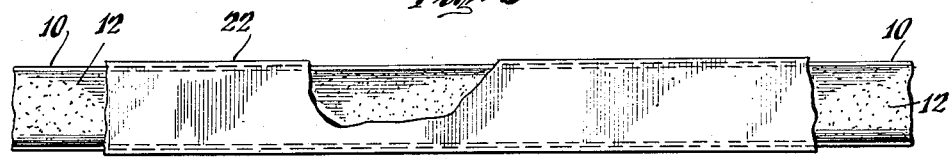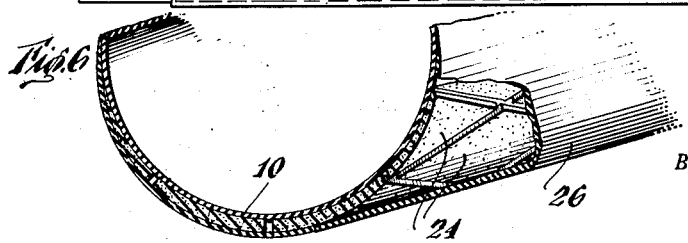
INVENTORS
Kenneth V. Hardman
Arthur J. Lang
BY Robert Calvert
ATTORNEY Patented Nov. 3, 1953

UNITED STATES PATENT OFFICE 2,657,729

PUNCTUREPROOF TUBE AND SEALING MATERIAL THEREFOR

Kenneth V. Hardman, Upper Montclair, and Arthur J. Lang, Cedar Grove, N. J., assignors to H. V. Hardman Company, Inc., a corporation of New Jersey Application June 27, 1950, Serial No. 170,594

4 Claims. (Cl. 152—347)

This invention relates to an article of manufacture and a composition and method for use in making the article.

The invention is particularly useful in the manufacture of puncture-proof inner tubes for automobile, truck and bicycle tires. For this reason the invention will be first illustrated by description in connection with such use.

Puncture-proof pneumatic tires have been under study and in limited use for 25 years or more. During this period, there has been developed a tube of sandwich wall on the road side of the tube. This construction includes rubber, butyl rubber, or other rubber substitute as the walls of the sandwich and a gummy mass between them. In the case of puncture of the tube and subsequent withdrawal of the puncturing means, the gummy mass flows into the puncture and seals it against loss of air.

In this type of puncture-proof tube, the gum used is ordinarily a mixture of unvulcanized rubber with a softener therefor. Asphalt is a common softener, the attempt being made to control the consistency of the gum by means of the proportion of asphalt to the rubber, the kind of asphalt chosen, and kind and proportion of fillers.

The limited use of puncture-proof tires has been due in part to problems that remain unsolved in the manufacture and use of such tubes.

It is well known, for instance, that the temperature of the inner tube of a motor tire varies over a wide range, from the lowest temperatures of winter to 200° to 250° F. in summer driving. It is well known, also that the unvulcanized rubber of the gum layer is susceptible to extreme changes in consistency and viscosity with temperature. At the highest temperatures of fast driving in hot weather, an unvulcanized rubber gum that is passable in winter may be so fluid as to flow through a puncture and not seal it against the escape of air or, under the influence of the strong centrifugal force to which the gummy mass is subjected, may flow and create unbalance of the tire. At the lowest winter temperatures, on the other hand, the unvulcanized rubber becomes rigid and too firm to close the puncture dependably.

An additional difficulty with puncture-proof tubes has been the change in the unvulcanized rubber of the gum layer on aging. This gum layer has the property of withdrawing sulfur from the vulcanized rubber of the inner and outer layers of the sandwich with which the gum is in contact. The sulfur so withdrawn operates, particularly at temperatures to which the mass is raised during driving, to cause curing and objectionable changes from the originally established properties of the gum layer.

Our invention provides a composition, method and article overcoming these disadvantages and giving a puncture-proof tire that is satisfactory at all temperatures within the wire range to which the tire is subjected during use and that retains those properties.

Briefly stated, our invention comprises the herein described composition including heat depolymerized natural rubber and a gelling agent therefor. The invention comprises also the puncture-proof pneumatic tube utilizing the said composition for sealing punctures that may be formed in the tube and the method of making the improved tube.

The invention will be first described in connection with the attached drawings to which reference is made.

Fig. 1 is a cross section through the puncture-proof tube.

Fig. 2 is an enlargement of a fragment of the tube showing a penetrating nail.

Fig. 3 is an enlargement of a fragment of the tube showing punctures filled in by our gummy mass.

Fig. 4 is a perspective view of the inner tube with the gummy mass applied during a step in the manufacture of the tube.

Fig. 5 is a top plan view of the assembly before vulcanization.

Fig. 6 is a perspective view of the road side of a modification of the invention partly broken away for clearness of illustration.

There is shown the puncture-proof tube with tubular element 10, a layer of our gummy composition 12 applied over the part of the said element that is towards the road when the tube is in use, and a covering layer 14 of material of the same composition as the element 10 applied over the outside of the gummy composition 12.

Puncture by a nail 16 and the subsequent flowing of the gummy composition into the holes 18, left when the nail is removed, are shown in Figs. 2 and 3.

Figs. 4 and 5 represent stages in the manufacture of the puncture-proof tube. The element 10 is one that has been formed by extrusion in a usual manner. At the stage shown in Figs. 4 and 5, the element is in uncured condition and suitably in collapsed form. Over it, there is spread the gummy layer 12 of width approximately equal to 140° of the circumference of the tube when inflated. Spreader 20 is shown in the position of applying the mass.

Over the layer 12 of gummy material, there is applied a sheet 22 of rubbery composition of the same type as that which composes the tubular element 10. This sheet may be provided on the flaps, extending beyond the gummy mass, with a conventional cement (not shown) or with a tacky surface and adhered to the element 10 at positions beyond the edges of the layer 12, as shown.

The assembly so made is then cut and the ends joined to form the circular pneumatic tube and the whole cured in usual manner as in a watch-case mold.

In the modification shown in Fig. 6, strips 24 extend from the cover layer 26 (corresponding to 14 in the embodiment of Fig. 1). The strips cut through the gummy mass during the assembly and serve to compartmentize the gummy mass in the finished tube.

As to materials, the tubular element 10 and the covering sheet 14 are constructed of vulcanized rubber material, this term including any one of the rubber or rubber substitute materials in use at this time for inner tubes for automobile tires. Thus, the parts 10 and 14 may be natural rubber, butadiene and styrene copolymer, or isobutylene and isoprene copolymers known as butyl rubber, all in vulcanized condition.

The gum layer in our tube contains heat depolymerized rubber such as that made as described in United States Patent No. 2,349,549 issued to Hardman and Hardman and entitled Method of Making Depolymerized Rubber Articles, issued May 23, 1944. The depolymerized rubber contains no volatile solvents. It is preferably of low viscosity as, for instance, 19,000 to 100,000 centipoises when measured at 150° F.

With the depolymerized rubber we use a gelling agent. The agent used must be one which, in the proportion used will cause curing of the depolymerized rubber composition to a soft gummy mass having the general characteristics of a partly vulcanized tacky rubber compound. A gelling agent that meets these general requirements and may be used in sulfur itself in low proportion. The combination of the heat depolymerized rubber and the low proportion of sulfur is relatively insensitive to sulfur withdrawn from sheets 10 and 14 during use. The combination does not harden to an objectionable extent during use, even in contact with the additional sulfur.

Other gelling agents that may be used are ferric chloride, stannous and stannic chloride, and benzoyl and like organic peroxides. These other gelling agents are retarders of sulfur curing of depolymerized rubber. As a result, these other agents act also as retarders. They give not only the desired type of product initially but also practically eliminate any vulcanization by sulfur that migrates, during use of the puncture-proof tube, from the outer and inner layers of the inner tube to the tacky composition between those layers.

If the sulfur is used, there may also and preferably is used a conventional vulcanization accelerator, such as zinc dibutyl dithiocarbamate, mercaptobenzothiazole, and tetramethylthiuram disulfide.

Conventional anti-oxidants are also used in the sulfur composition as, for instance, phenyl beta-naphthylamine (AgeRite powder), diphenylamine and acetone reaction (B-L-E), and butyraldehyde and aniline condensation product (Antox).

Usual fillers may be incorporated, such as whiting, clay, zinc oxide, diatomaceous earth, and asbestine.

Proportions of the gelling agents may be varied from 0.1 part to 1.0 part of sulfur for 100 parts of the depolymerized rubber. The proportions of the other gelling agents may be larger, as, for example 5 to 15 parts. They are used with water in proportion to dissolve the agents before incorporation into the depolymerized rubber.

The invention will be further illustrated by description in connection with the following specific examples. Proportions here and elsewhere herein are expressed as parts by weight.

EXAMPLE 1

| | Parts |
|---|---|
| Heat depolymerized rubber | 100 |
| Sulfur | 1 |
| Zinc oxide | 5 |
| Clay | 20 |
| Anti-oxidant ("Antox") | 1 |
| Zinc butyl thiocarbamate | 1.5 |

The compounding is performed in a mixer of the kneading type. To effect good dispersion of ingredients, the mixing is carried out at a high viscosity by withholding initially part of the depolymerized rubber but adding all of the pre-sifted dry ingredients. The mulling proceeds at this high viscosity until all the particles are dispersed. Then the remaining depolymerized rubber is added. At the elevated temperatures of road usage of a tire, this composition does not melt or become fluid as does a thermoplastic liquid. Neither does the composition become brittle or rigid at sub-zero temperatures as does an unvulcanized rubber gel.

EXAMPLE 2

| | Parts |
|---|---|
| Depolymerized rubber low viscosity | 100 |
| Sulfur | 0.5 |
| Zinc oxide | 5 |

EXAMPLE 3

| | Parts |
|---|---|
| Depolymerized rubber of low viscosity | 100 |
| Sulfur | 0.25 |
| Tetramethyl thiuram disulfide | 0.75 |
| Zinc oxide | 5 |

EXAMPLE 4

| | Parts |
|---|---|
| Depolymerized rubber of low viscosity | 100 |
| Clay | 20 |
| Zinc oxide | 5 |
| Oleic acid | 3 |
| Dipentamethylene thiuram tetrasulfide | 1 |

Examples 2, 3, and 4 are compounds which are mixed together in the unvulcanized state and applied as described, the whole assembly being vulcanized at the same time during which the inner tube walls and gum filler cure integrally and simultaneously.

The compound of Example 2 is a much slower curing compound than the compounds of Examples 3 and 4. The compound of Example 2 may be prevulcanized in part before application to the tube.

EXAMPLE 5

| | Parts |
|---|---|
| Depolymerized rubber of low viscosity | 100 |
| Ferric chloride (FeCl$_3$) | 5 |
| Water | 5 |

EXAMPLE 6

| | Parts |
|---|---|
| Depolymerized rubber of low viscosity | 100 |
| Stannous chloride (SnCl₂) | 5 |
| Water | 5 |

*Procedures for Examples 5 and 6*

These gelling agents cause the depolymerized rubber to gum at a slower rate than in the cases of Examples 2, 3, and 4. It is possible to apply the admixtures as outlined in Examples 3 and 4 and to vulcanize integrally with the tube structure provided a slow cure is permissible, as, for instance, in the vicinity of 2 hours at a temperature of approximately 275° F. However, if this is not desirable the compounds under Examples 5 and 6 may first be heated with agitation for a period of between 1 and 2 hours at a temperature of about 275° F. This time-temperature cycle advances the gum to an intermediate stage which still allows a free flowing consistency when the intermediate compound is pumped or spread upon the road surface of the inner tube. The vulcanization of the tube then provides sufficient time and temperature to complete the gumming or partial solidification of these Examples 5 and 6 to a state comparable to a partially vulcanized depolymerized rubber which displays the surprising but inherent ability to retain its basic gum consistency over wide ranges of temperature.

EXAMPLE 7

| | Parts |
|---|---|
| Depolymerized rubber of low viscosity | 100 |
| Benzoyl peroxide | 5 |

EXAMPLE 8

| | Parts |
|---|---|
| Depolymerized rubber of low viscosity | 100 |
| Quinone | 5 |
| Mercuric oxide | 3 |

EXAMPLE 9

| | Parts |
|---|---|
| Depolymerized rubber of low viscosity | 100 |
| Metadinitrobenzene | 10 |
| Lead oxide | 10 |

The compounds of the last two examples are also slower in curing rate than present day inner tube curing cycles and, therefore, may be partly heat cured to an intermediate state and spread by pumping or coating upon the inner tube followed by integral curing with the tube itself.

It will be understood that it is intended to cover all changes and modifications of the examples of the invention herein chosen for the purpose of illustration which do no constitute departures from the spirit and scope of the invention.

What we claim is:

1. A tube for a puncture-proof pneumatic tire comprising a tubular element of vulcanized rubber material, a gummy mass disposed as a layer over the side of the said element that is towards the road during use in a tire, and a sheet of vulcanized material disposed over the gummy mass and enclosing it between the said sheet and element, the gummy mass comprising heat depolymerized rubber and a gelling agent and the gelling agent being used in proportion to produce a gummy mass with the depolymerized rubber but less than the amount causing the gummy mass to become rigid during use on long contact with the vulcanized material.

2. A tube as described in claim 1, the depolymerized rubber being of viscosity 19,000 to 100,000 centipoises when measured at 150° F. and the gelling agent being sulfur.

3. A tube as described in claim 1, the gelling agent being sulfur in the proportion of 0.1 to 1 part for 100 parts of the depolymerized rubber.

4. A tube as described in claim 1, the gelling agent being dipentamethylene thiuram tetrasulfide.

KENNETH V. HARDMAN.
ARTHUR J. LANG.

References Cited in the file of this patent

UNITED STATES PATENTS

| Number | Name | Date |
|---|---|---|
| 1,137,461 | Clare | Apr. 27, 1915 |
| 1,237,698 | Reuter | Aug. 21, 1917 |
| 1,249,181 | Ostromislensky | Dec. 4, 1917 |
| 1,751,817 | Jones et al. | Mar. 25, 1930 |
| 2,255,779 | Kent | Sept. 16, 1941 |
| 2,349,549 | Hardman et al. | May 23, 1944 |

OTHER REFERENCES

"Rubber Age" (New York), vol. 66 of January 1950, pp. 419-422 inc.